(12) United States Patent
Maltsey et al.

(10) Patent No.: US 7,519,125 B2
(45) Date of Patent: Apr. 14, 2009

(54) MULTICARRIER RECEIVER AND METHODS OF GENERATING SPATIAL CORRELATION ESTIMATES FOR SIGNALS RECEIVED WITH A PLURALITY OF ANTENNAS

(75) Inventors: Alexander Alexandrovich Maltsey, Nizhny Novgorod (RU); Roman Olegovich Maslennikov, Nizhny Novgarod (RU); Alexey Vladimirovich Khoryaev, Dzerzhinsk (RU); Vladimir Alexandrovich Pestretsov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 428 days.

(21) Appl. No.: 11/350,621

(22) Filed: Feb. 9, 2006

(65) Prior Publication Data

US 2006/0140297 A1 Jun. 29, 2006

Related U.S. Application Data

(63) Continuation of application No. PCT/RU2004/000379, filed on Sep. 29, 2004.

(51) Int. Cl.
*H04K 1/10* (2006.01)
*H04L 27/28* (2006.01)
(52) U.S. Cl. .................. 375/260; 375/267; 375/229; 375/316
(58) Field of Classification Search ........... None
See application file for complete search history.

(56) References Cited

U.S. PATENT DOCUMENTS

| 5,973,638 | A  | * | 10/1999 | Robbins et al. | ............ 342/172 |
| 6,717,976 | B1 | * | 4/2004  | Shen           | ............ 375/147 |
| 6,766,144 | B2 | * | 7/2004  | Kim et al.     | ............ 455/67.11 |
| 6,920,192 | B1 | * | 7/2005  | Laroia et al.  | ............ 375/347 |
| 7,068,628 | B2 | * | 6/2006  | Li et al.      | ............ 370/334 |
| 2002/0131537 | A1 | | 9/2002 | Storm et al.   | |
| 2003/0218973 | A1 | * | 11/2003 | Oprea et al.   | ............ 370/210 |
| 2003/0235243 | A1 | | 12/2003 | He             | |
| 2004/0228399 | A1 | * | 11/2004 | Fimoff et al.  | ............ 375/233 |

FOREIGN PATENT DOCUMENTS

EP 1028563 A2 8/2000

OTHER PUBLICATIONS

Deneire, L., et al., "A Low-Complexity ML Channel Estimator For OFDM", *IEEE Transactions on Communications*, 51 (2), (Feb. 1, 2003), 135-140.

* cited by examiner

*Primary Examiner*—Shuwang Liu
*Assistant Examiner*—Gina Mckie
(74) *Attorney, Agent, or Firm*—Schwegman, Lundberg & Woessner, P.A.; Gregory J. Gorrie

(57) ABSTRACT

In a multicarrier receiver, spatial correlation estimates are enhanced by multiplying by weighting values generated from a channel length estimate. The channel length estimate is calculated from a channel estimate (e.g., an estimate of the channel response function) and a signal-to-noise ratio estimate. The spatial correlation estimates represent the correlation between frequency-domain samples from different antennas.

25 Claims, 6 Drawing Sheets

$$F = \begin{bmatrix} 1 & 1 & \cdots & 1 \\ 1 & e^{-2\pi j/N_{FFT}} & \cdots & e^{-2\pi j(N_{FFT}-1)/N_{FFT}} \\ 1 & e^{-4\pi j/N_{FFT}} & \cdots & e^{-4\pi j(N_{FFT}-1)/N_{FFT}} \\ 1 & e^{-6\pi j/N_{FFT}} & \cdots & e^{-6\pi j(N_{FFT}-1)/N_{FFT}} \\ \vdots & \vdots & \ddots & \vdots \\ 1 & e^{-2\pi j(N_{FFT}-1)/N_{FFT}} & \cdots & e^{-2\pi j(N_{FFT}-1)(N_{FFT}-1)/N_{FFT}} \end{bmatrix} \sim 302$$

FIG. 3A $$F_U = \begin{bmatrix} 1 & 1 & \cdots & 1 \\ 1 & e^{-6\pi j/N_{FFT}} & \cdots & e^{-6\pi j(N_{FFT}-1)/N_{FFT}} \\ \vdots & \vdots & \ddots & \vdots \\ 1 & e^{-2\pi j(N_{FFT}-1)/N_{FFT}} & \cdots & e^{-2\pi j(N_{FFT}-1)(N_{FFT}-1)/N_{FFT}} \end{bmatrix} \sim 304$$

FIG. 3B

MULTICARRIER RECEIVER AND METHODS OF GENERATING SPATIAL CORRELATION ESTIMATES FOR SIGNALS RECEIVED WITH A PLURALITY OF ANTENNAS

This application is a continuation under 35 U.S.C. 111(a) of International Application No. PCT/RU2004/000379, filed on 29 Sep. 2004, which is incorporated herein by reference.

TECHNICAL FIELD

Embodiments of the present invention pertain to wireless communications. In some embodiments, the present invention pertains to multicarrier receivers. In some embodiments, the present invention pertains to wireless local area networks.

BACKGROUND

Wireless receivers may employ more than one receive antenna to improve their receiving capability and allow for the receipt of more than one spatial data stream. The correlation of signals received from the different antennas should be accurately estimated for further processing of the signals. Spatial correlation estimates may be used for spatial signal detection, spatial signal separation, equalizer weight calculation (i.e., for use in a combiner), and/or reduction/cancellation of co-channel interference. Thus, there are general needs for receivers and methods of obtaining accurate estimates of the correlation between multicarrier signals received through more than one antenna.

BRIEF DESCRIPTION OF THE DRAWINGS

FIGS. 3A and 3B illustrate examples of fast Fourier transformation (FFT) matrices in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to voluntarily limit the scope of this application to any single invention or inventive concept if more than one is in fact disclosed.

Figure 1:
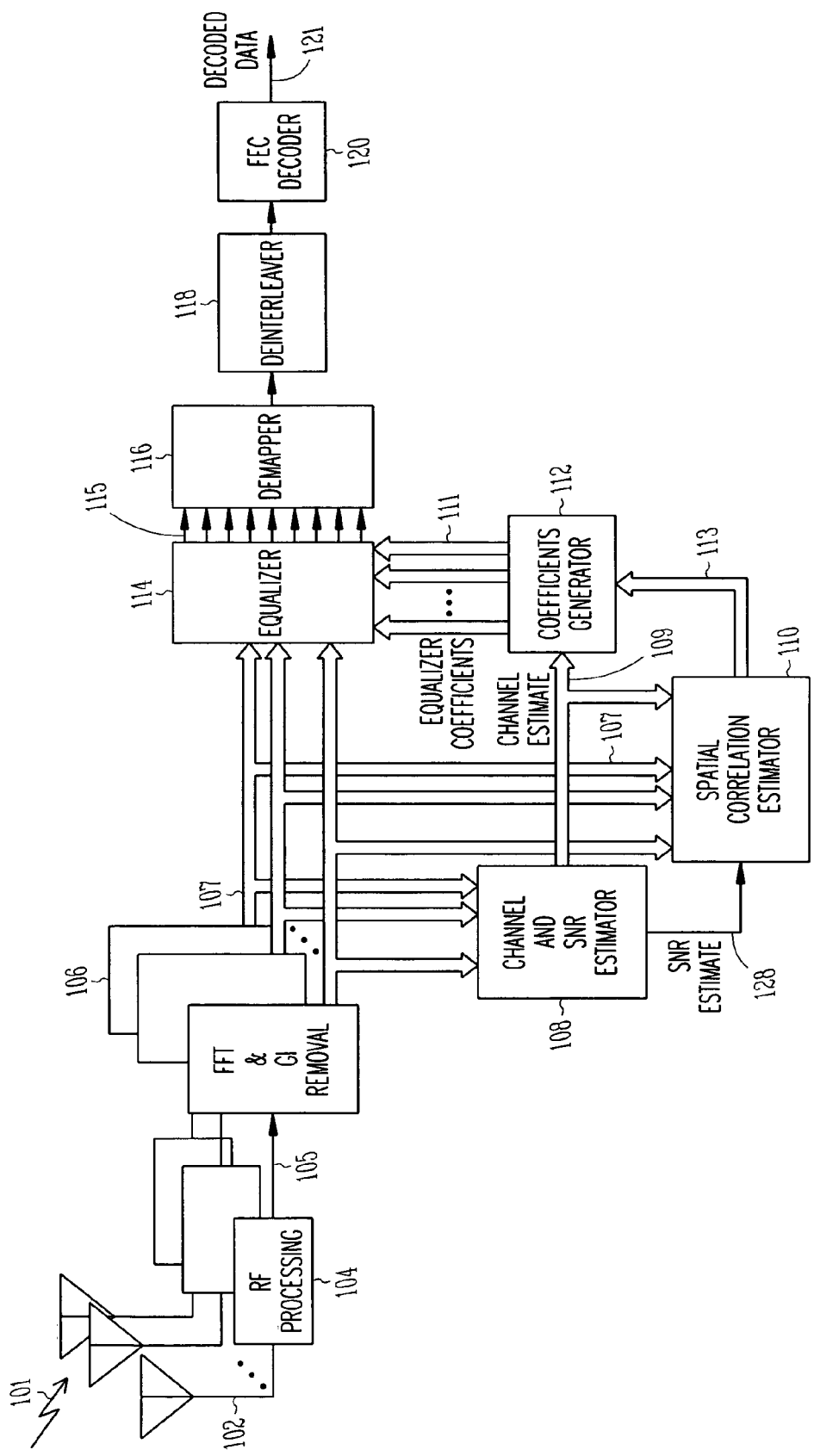
FIG. 1 is a block diagram of a multicarrier receiver in accordance with some embodiments of the present invention.

FIG. 1 is a block diagram of a multicarrier receiver in accordance with some embodiments of the present invention. Multicarrier receiver 100 may receive communication signals 101 through a communication channel and may generate decoded bit stream output 121 from communication signals 101. In some embodiments, multicarrier receiver 100 may receive multicarrier communication signals 101 that may have been transmitted by a multicarrier transmitter with one or more antennas 102. These multicarrier communication signals may comprise one or more spatial data streams transmitted with more than one antenna and may take advantage of antenna diversity to convey additional data without an increase in bandwidth. In some embodiments, the multicarrier signals may comprise orthogonal frequency division multiplexed (OFDM) signals, although the scope of the invention is not limited in this respect.

Multicarrier receiver 100 includes radio-frequency (RF) processing circuitry 104 to generate digital signals 105. Each of digital signals 105 may be associated with a particular one of antennas 102. Multicarrier receiver 100 also includes fast-Fourier transformation (FFT) circuitry 106 to generate frequency-domain samples 107. Frequency-domain samples 107 may include frequency-domain samples associated each antenna and associated with each subcarrier of a received multicarrier communication signal. In some multicarrier embodiments, FFT circuitry 106 may generate a set of frequency-domain samples 107 for each antenna 102. Each set may include frequency-domain samples for each subcarrier of multicarrier communication signal 101.

Frequency-domain samples 107 may be equalized in equalizer 114 by the application of equalizer coefficients 111 to generate equalized frequency-domain samples 115 for each subcarrier received through each antenna 102. In some embodiments, the components of corresponding subcarriers received through different antennas 102 may be weighted and combined in equalizer 114 to generate one set of frequency-domain samples for each transmitted data stream. Demapping circuitry 116 may demap equalized frequency-domain samples 115 for each transmitted data stream to generate bits for subsequent deinterleaving by deinterleaver 118 and decoding by decoder 120 to generate serial symbol stream output 121. In some embodiments, decoder 120 may be a forward error correcting (FEC) decoder, although the scope of the invention is not limited in this respect.

Multicarrier receiver 100 also includes channel and signal-to-noise ratio (SNR) estimator 108 to generate channel estimate 109 and SNR estimate 128 from frequency-domain samples 107. Multicarrier receiver 100 also includes spatial correlation estimator 110 to generate spatial correlation estimates 113 from channel estimate 109, SNR estimate 128, and frequency-domain samples 107. Multicarrier receiver 100 also includes equalizer coefficient generating circuitry 112 to generate equalizer coefficients 111 from spatial correlation estimates 113 and channel estimate 109 for use by equalizer 114. Spatial correlation estimates 113 may represent the correlation between frequency-domain samples 107 from the different antennas.

Figure 2:
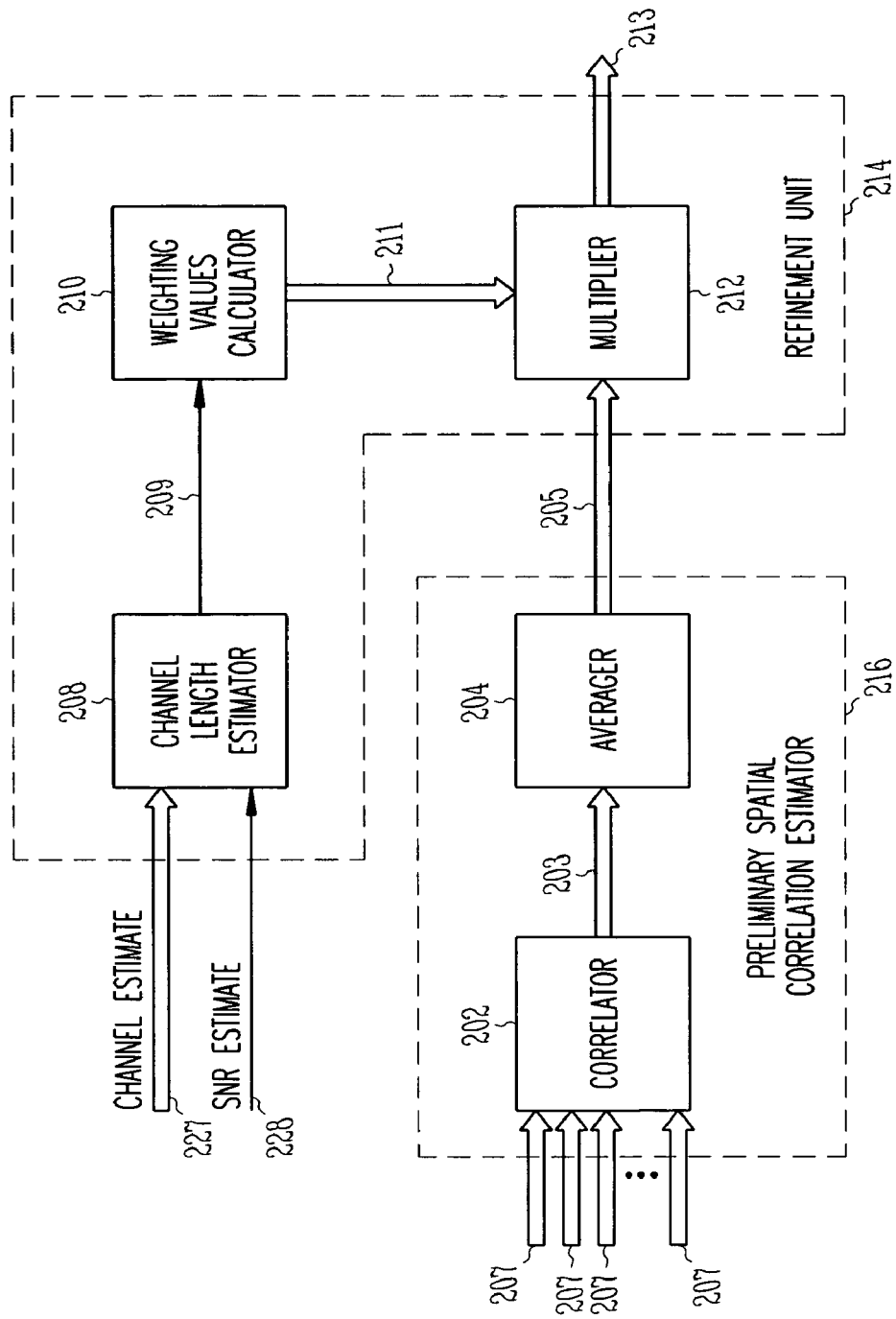
FIG. 2 is a block diagram of a spatial correlation estimator in accordance with some embodiments of the present invention.

FIG. 2 is a block diagram of a spatial correlation estimator in accordance with some embodiments of the present invention. Spatial correlation estimator 200 may be used to generate final spatial correlation estimates 213 for use by a multicarrier receiver. In some embodiments, spatial correlation estimator 200 may be suitable for use as spatial correlation estimator 110 (FIG. 1) for generating spatial correlation estimates 113 (FIG. 1), although other spatial correlation estimates may also be suitable.

Spatial correlation estimator 200 includes preliminary spatial correlation estimator 216 to generate initial spatial correlation estimates 205. Spatial correlation estimator 200 also includes refinement unit 214 to refine initial spatial correlation estimates 205 and generate final spatial correlation estimates 213.

Refinement unit 214 may include channel length estimator 208 to generate channel length estimate 209 based on channel estimate 227 and SNR estimate 228. Channel estimate 227 may correspond to channel estimate 109 (FIG. 1) and SNR estimate 228 may correspond to SNR estimate 128 (FIG. 1). Refinement unit 214 may also include weighting values calculator 210 to calculate weighting values 211 from channel length estimate 209. Refinement unit 214 may also include multiplier 212 to multiply initial spatial correlation estimates 205 by weighting values 211 to generate final spatial correlation estimates 213.

Preliminary spatial correlation estimator 216 may include correlator 202 to perform correlations on frequency-domain samples 207 from different antennas, which may be provided by FFT circuitry 106 (FIG. 1). Frequency-domain samples 207 may correspond to frequency-domain samples 107 (FIG. 1). Preliminary spatial correlation estimator 216 may also include averager 204 to average correlation outputs 203 over a plurality of symbols to generate initial spatial correlation estimates 205.

Although receiver 100 (FIG. 1) and spatial correlation estimator 200 are illustrated as having several separate functional elements, one or more of the functional elements may be combined and may be implemented by combinations of software-configured elements, such as processing elements including digital signal processors (DSPs), and/or other hardware elements. For example, any or all of the elements of spatial correlation estimator 200 may comprise one or more microprocessors, DSPs, application specific integrated circuits (ASICs), and combinations of various hardware and logic circuitry for performing at least the functions described herein. In some embodiments, the functional elements of receiver 100 (FIG. 1) and spatial correlation estimator 200 (FIG. 2) may refer to one or more processes operating on one or more processing elements.

In some embodiments, multiplier 212 may generate spatial correlation estimates 213 for use by multicarrier receiver 100 (FIG. 1) in processing multicarrier communication signal 101 (FIG. 1) received through a plurality of antennas 102 (FIG. 1). In some embodiments, multicarrier receiver 100 (FIG. 1) may receive multicarrier communication signal 101 (FIG. 1) over a fading, frequency-selective communication channel with antennas 102. Final spatial correlation estimates 213 may be used to separate spatial channel components of multicarrier communication signal 101. In some embodiments, final spatial correlation estimates 213 may be used to help reduce and/or cancel co-channel interference, for signal detection and to help determine equalization weight calculations for the different antennas. In some embodiments, the equalization weight calculations may be used in a multiple-input multiple output (MIMO) communication system.

In some embodiments, channel length estimator 208 may calculate channel length estimate 209 from the channel's impulse response in the time domain. In these embodiments, the channel impulse response may be obtained as an inverse FFT (IFFT) of channel estimate 227 (i.e., in the frequency domain), and channel length estimate 209 may be calculated as maximum delay of the channel impulse response tap which exceeds a predetermined upper threshold. In some embodiments, the value of the predetermined upper threshold may be changed based on SNR estimate 228. In these embodiments, the threshold value may be increased for low SNR estimates and may be decreased for high SNR estimates, although the scope of the invention is not limited in this respect.

Figure 3C:
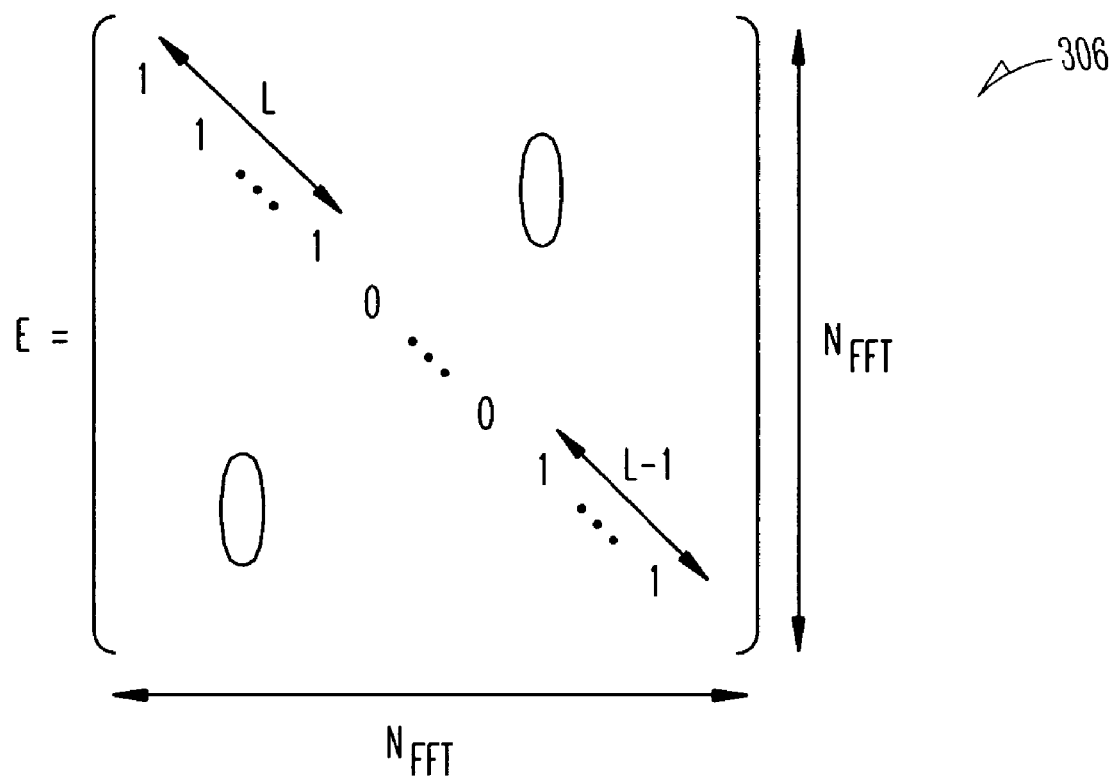
FIG. 3C illustrates an example of a channel length matrix in accordance with some embodiments of the present invention.

FIGS. 3A and 3B illustrate examples of fast Fourier transformation (FFT) matrices in accordance with some embodiments of the present invention. FIG. 3C illustrates an example of a channel length matrix in accordance with some embodiments of the present invention.

FFT matrix 302 (FIG. 3A) may be used by weighting values calculator 210 (FIG. 2). Modified FFT matrix 304 (FIG. 3B) may be generated by weighting values calculator 210 (FIG. 2) based on FFT matrix 302 (FIG. 3A). Channel length matrix 306 (FIG. 3C) may also be generated by weighting values calculator 210 (FIG. 2) based on channel length estimate 209 (FIG. 2).

In some embodiments, weighting values calculator 210 (FIG. 2) may generate a weighting matrix (P) comprising weighting values 211 (FIG. 2). In these embodiments, weighting values calculator 210 may generate a channel length matrix (E) 306 from channel length estimate 209 by placing zeroes in non-diagonal positions, by placing ones in some diagonal positions based on channel length estimate 209, and by placing zeros in some other of the diagonal positions. In some embodiments, channel length matrix (E) 306 may be an $N_{FFT} \times N_{FFT}$ matrix in which $N_{FFT}$ may be the size of the FFT performed by FFT circuitry 106 (FIG. 1), although the scope of the invention is not limited in this respect. In these embodiments, channel length matrix (E) 306 may be generated by placing zeroes in non-diagonal positions and by placing ones in the first L diagonal positions and the last L-1 diagonal positions, where L corresponds to channel length estimate 209.

Weighting values calculator 210 may generate the weighting matrix (P) by multiplication of modified fast Fourier transformation FFT matrix ($F_u$) 304, channel length matrix (E) 306 and a pseudo-inverse matrix ($F_u^{\#}$) of the modified FFT matrix ($F_u^{-1}$) that may be defined by the following equation.

$$F_u^{\#} = F_u^H (F_u F_u^H)^{-1}$$

In this equation, superscript$^H$ denotes a Hermitian transpose. In these embodiments, weighting matrix (P) may be represented as:

$$P = F_u E F_u^{\#}$$

In some embodiments, modified FFT matrix ($F_u$) 304 may be generated by weighting values calculator 210 by removing rows (e.g., row vectors) corresponding to inactive subcarriers from initial FFT matrix (F) 302. Initial FFT matrix (F) 302 may describe an FFT of a time-domain signal sample sequence to a frequency-domain signal spectrum sample sequence. Alternatively, modified FFT matrix ($F_u$) 304 may be generated by including rows corresponding to active subcarriers (i.e., pilot and data subcarriers) from initial FFT matrix (F) 302.

In this way, matrices $F_u^{\#}$ and $F_u$ depend on the FFT size and the structure of the active subcarriers, which may be defined by a communication standard. In some embodiments, modified FFT matrix ($F_u$) 304 may have dimensions of $N_{sc} \times N_{FFT}$, channel length matrix (E) 306 may be a diagonal matrix having dimensions of $N_{FFT} \times N_{FFT}$, and the pseudo-inverse of the modified FFT matrix ($F_u^{\#}$) may have dimensions of $N_{FFT} \times N_{sc}$. In these embodiments, $N_{sc}$ may be a number of the active subcarriers, and $N_{FFT}$ may be the size of an FFT performed by the FFT circuitry 106 (FIG. 1) to generate frequency-domain samples 207. In some embodiments, $N_{sc}$ the number of active subcarriers, may range from one to 64, and $N_{FFT}$, the FFT size, may range from one to 64, although the scope of the invention is not limited in this respect.

In some embodiments, weighting values calculator 210 may remove row vectors corresponding to inactive subcarriers from initial FFT matrix (F) 302 to generate modified FFT matrix ($F_u$) 304. In these embodiments, modified FFT matrix ($F_u$) 304 is not a square matrix (i.e., $N_{FFT}$ is not equal to $N_{sc}$), although the scope of the invention is not limited in this respect.

Figure 4:
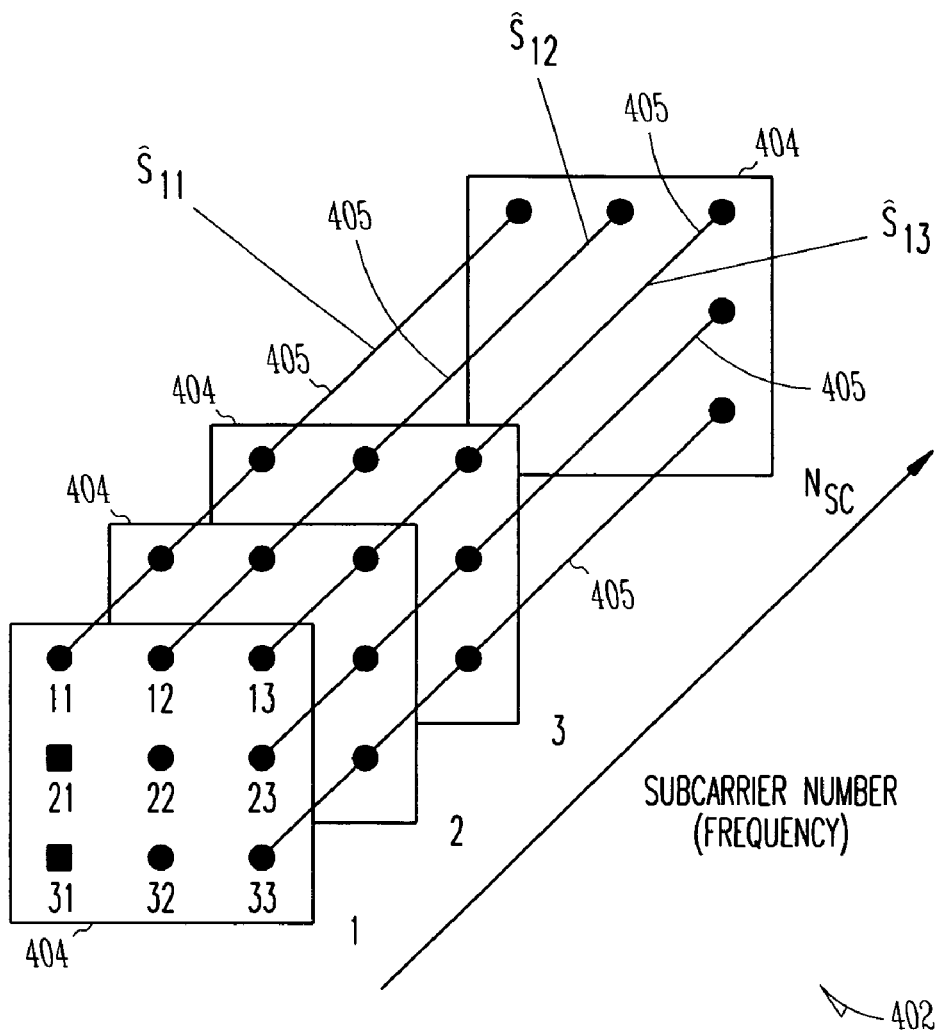
FIG. 4 illustrates the structure of spatial correlation matrices in accordance with some embodiments of the present invention.

FIG. 4 illustrates the structure of spatial correlation matrices in accordance with some embodiments of the present invention. Spatial correlation matrices 402 may comprise an individual spatial correlation matrix 404 for each subcarrier of the multicarrier communication signal. In these embodiments, each spatial correlation matrix 404 may be associated with one subcarrier frequency (or tone). In some embodiments, spatial correlation matrices 402 may illustrate preliminary spatial correlation matrices generated by preliminary spatial correlation estimator 216 (FIG. 2) and may correspond to preliminary spatial correlation estimates 205 (FIG. 2). Final spatial correlation estimates 213 (FIG. 2) may also be similar in structure to spatial correlation matrices 402.

In some embodiments, sets 405 comprise matrix elements in the same position of each matrix 404. Sets 405 may represent a power spectral density for a particular antenna when a set 405 comprises corresponding diagonal elements of each matrix 404. Sets 405 may represent a mutual power spectral density for a particular pair of antennas when a set 405 comprises corresponding non-diagonal elements of each matrix 404.

In some embodiments, weighting values 211 (FIG. 2) may comprise a single weighting matrix (P) generated from channel length estimate 209 (FIG. 2), and preliminary spatial correlation estimates 205 may comprise preliminary spatial correlation matrix 404 for each active subcarrier of multicarrier communication signal 101 (FIG. 1). In these embodiments, multiplier 212 (FIG. 2) may multiply corresponding elements of each set 405 of the elements (i.e., in the same position of spatial correlation matrices 404) by the weighting matrix (P) to generate a refined set of matrix elements (for each position in matrices 404). These refined sets of matrix elements may comprise final spatial correlation matrices for each subcarrier 404 and may correspond to final spatial correlation estimates 213 (FIG. 2).

In some embodiments, only sets 405 of diagonal matrix elements that reside above the diagonal matrix elements may need to be multiplied by the weighting matrix (P) to generate the refined sets of matrix elements. In these embodiments, the refined sets of matrix elements that reside below the diagonal elements may be equal to the complex conjugate of the refined sets located symmetrically relatively to the matrix diagonal. For example, each element of a refined set corresponding to a matrix element with an index of "n, m" may be equal to the complex conjugate of elements of the refined set corresponding to a matrix element with an index of "m, n".

In some embodiments, the weighting matrix (P) may have dimensions $N_{sc} \times N_{sc}$, wherein $N_{sc}$ is the number of active subcarriers of the multicarrier communication signal. In some embodiments, each of the preliminary and final spatial correlation matrices may have dimensions of N×N, where N is the number of antennas 102 (FIG. 1) being used to receive the multicarrier communication signal. In some embodiments, the number of antennas 102 (FIG. 1) may range from two to as great as four or more.

In some embodiments, final spatial correlation estimates 213 (FIG. 2) may represent an estimate of auto-correlation and cross-correlation between the antennas 102 (FIG. 1) for each of a plurality of subcarriers comprising the multicarrier communication signal 101 (FIG. 1).

In some embodiments, correlator 202 (FIG. 2) may perform a symbol-by-symbol correlation on frequency-domain samples 207 (FIG. 2) for each of a plurality of subcarriers of the multicarrier communication signal 101 (FIG. 1) received by each antenna 102 (FIG. 1). Averager 204 (FIG. 2) may average correlation outputs 203 (FIG. 2) over a plurality of samples to generate a preliminary spatial correlation matrix for each subcarrier. In these embodiments, FFT circuitry 106 (FIG. 1) may perform FFTs on signals received through each antenna 102 (FIG. 1) to generate frequency-domain samples 207 (FIG. 2) for each subcarrier and for each antenna.

Referring back to FIG. 3, the structure of channel length matrix (E) 306 can be understood as follows. The pseudo-inverse of the FFT matrix ($F_u^{\#}$) may be viewed as an IFFT of the power spectral density estimate used to obtain an estimate of the correlation sequence. The estimate of the correlation sequence may be enhanced by multiplication by channel length matrix (E) 306 which may retain the most significant first L and last L-1 elements of the correlation sequence (i.e., by multiplication by ones) and sets to zero other elements of the correlation sequence estimate (i.e., by multiplication by zero), where L represents the channel length. The enhanced estimate of the correlation sequence may be transferred to an enhanced estimate of the power spectral density by FFT matrix ($F_u$) 304. The size of channel length matrix (E) 306 may be $N_{FFT} \times N_{FFT}$.

Because the total correlation sequence may have zero samples for $L < k < N_{FFT} - L + 1$, the accuracy of a correlation sequence estimate as well as the accuracy of power spectral density estimates and the spatial correlation matrix estimates may be improved. A cyclic correlation sequence of a multicarrier communication signal may be represented as:

$$r_{mn} = \{r_{mn}[1], r_{mn}[2], \ldots, r_{mn}[N_{FFT}]\}^T.$$

The signal may be a sum of the multicarrier signals from one or several transmitters which have propagated through communication channels with an additive white Gaussian noise. As the multicarrier communication signal and noise are statistically independent, the correlation sequence may be rewritten as a sum of the correlation sequences of the multicarrier communication signal and noise respectively:

$$r_{mn} = r_{mn}^{Noise} + r_{mn}^{OFDM}$$

The noise may be considered to be white, so its correlation sequence may have only one non-zero sample:

$$r_{mn}^{Noise} = \{r_{mn}^{Noise}[1], 0, \ldots, 0\}$$

The initially transmitted multicarrier communication signal (i.e., the signal at the output of transmitter, which has not yet propagated through channel) may be known to be almost uncorrelated in the time domain. The length of the channel impulse response generally does not exceed the channel length L, and therefore the correlation time for a received multicarrier communication signal is generally not greater than L samples. The correlation sequence may thus have zero samples for $L < k < N_{FFT} - L + 1$, as illustrated by the following equation:

$$r_{mn}^{OFDM} = \{r_{mn}^{OFDM}[1], \ldots, r_{mn}^{OFDM}[L], 0, \ldots, 0, r_{mn}^{OFDM}[N_{FFT} - L + 1], \ldots, r_{mn}^{OFDM}[N_{FFT}]\}^T$$

In some embodiments, a-priori information about the structure of the multicarrier signal correlation sequence may be used for the enhancement of spatial correlation matrices estimate in the way described above, although the scope of the invention is not limited in this respect.

Figure 5:
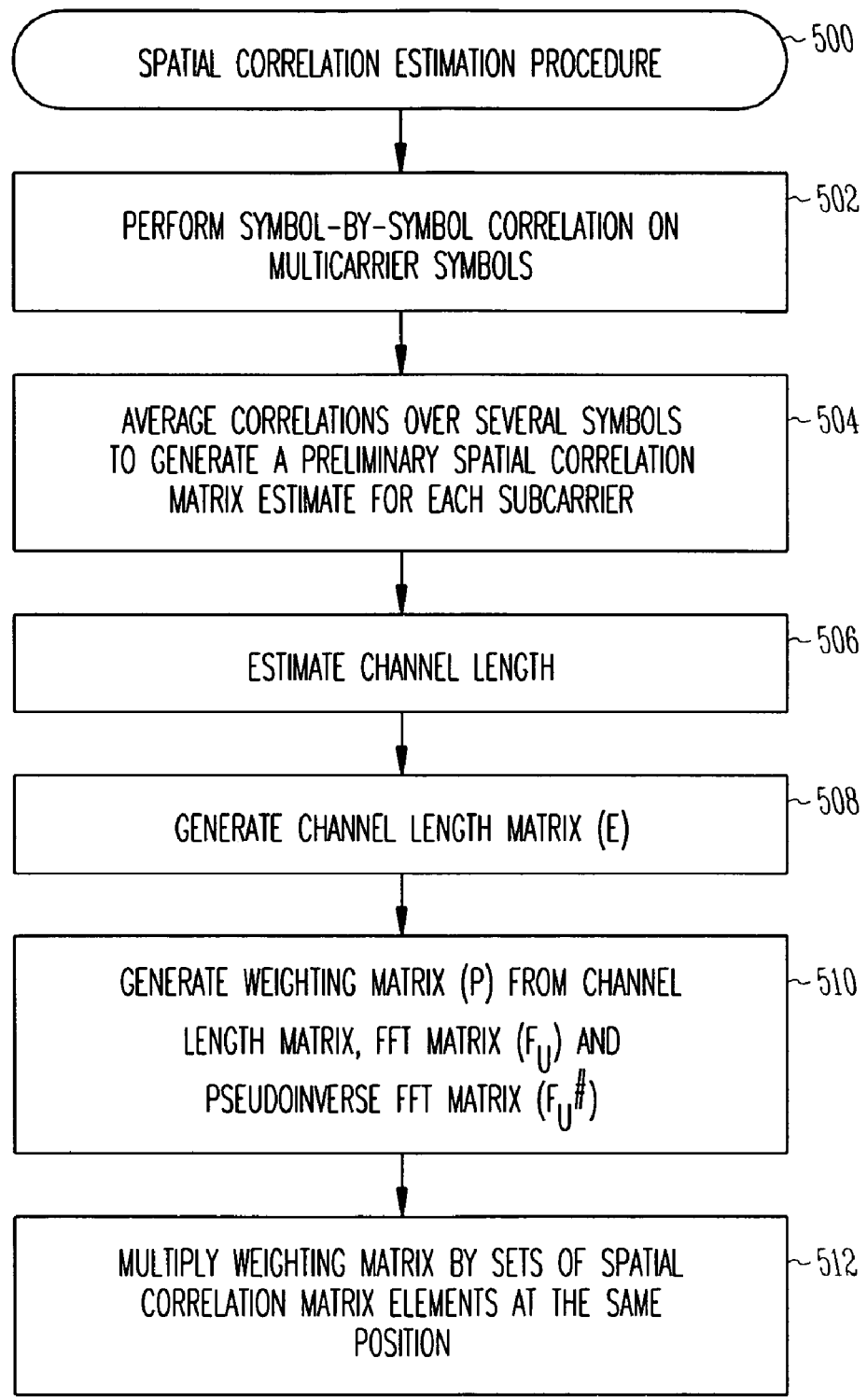
FIG. 5 is a flow chart of a spatial correlation estimation procedure in accordance with some embodiments of the present invention.

FIG. 5 is a flow chart of a spatial correlation estimation procedure in accordance with some embodiments of the present invention. Spatial correlation estimation procedure 500 may be performed by a spatial correlation estimator, such as spatial correlation estimator 200 (FIG. 2), although other signal processing circuitry may also perform spatial correlation procedure 500.

Operation 502 comprises performing a symbol-by-symbol correlation on frequency-domain samples generated from multicarrier signals received through more than one antenna. In some embodiments, symbol-by-symbol correlations may be performed on frequency-domain samples corresponding to each subcarrier frequency of the multicarrier communication signal and performed for each antenna. Operation 502 may be performed by correlator 202 (FIG. 2).

Operation 504 comprises averaging the correlations outputs generated in operation 502 over several symbols to generate a preliminary special correlation matrix for each subcarrier of the multicarrier communication signal. Operation 504 may be performed by averager 204 (FIG. 2).

Operation 506 comprises estimating the channel length based on a channel estimate and an SNR estimate. Operation 506 may be performed channel length estimator 208 (FIG. 2). In some embodiments, the channel length estimate may be generated from an impulse response of the channel estimate using a threshold value. In some embodiments, the threshold value may be adjusted based on the SNR estimate.

Operation 508 comprises generating a channel length matrix (E) from the channel length estimate generated on operation 506. The channel length matrix (E) may be generated by placing zeroes in non-diagonal positions, by placing ones in some diagonal positions based on the channel length estimate, and by placing zeros in some other of the diagonal positions. Operation 506 may be performed by weighting values calculator 210 (FIG. 2).

Operation 510 comprises generating a weighting matrix (P) by multiplying a modified fast Fourier transformation (FFT) matrix ($F_u$), the channel length matrix (E) and a pseudo-inverse of the modified FFT matrix ($F_u^{\#}$). Operation 510 may be performed by weighting values calculator 210 (FIG. 2).

Operation 512 comprises multiplying the weighting matrix (P) by sets of elements (e.g., sets 405 (FIG. 4)) of preliminary spatial correlation matrices generated in operation 504 to generate a final spatial correlation matrices for each subcarrier for use by a multicarrier receiver, such as receiver 100 (FIG. 1). Operation 512 may be performed by multiplier 212 (FIG. 2).

In some embodiments, the operations of procedure 500 may be performed on a regular basis to regularly update the spatial correlation estimates as channel conditions change. In some embodiments, operations of procedure 500 may be performed at the beginning of every received packet for several sequential multicarrier symbols. In other embodiments, operations of procedure 500 may be performed once for several multicarrier symbols or packets.

Referring to FIG. 1, in some embodiments, multicarrier receiver 100 may receive orthogonal frequency division multiplexed (e.g., OFDM) communication signals. In some embodiments, multicarrier receiver 100 may receive an OFDM symbol on a multicarrier communication channel. In some embodiments, the multicarrier communication channel may be a wideband channel may comprise one or more individual multicarrier channels. The individual multicarrier channels may be frequency-division multiplexed (i.e., separated in frequency from other individual multicarrier channels) and may be within a predetermined frequency spectrum. The individual multicarrier channels may comprise a plurality of orthogonal subcarriers. In some embodiments, the orthogonal subcarriers of an individual multicarrier channel may be closely spaced OFDM subcarriers. To achieve orthogonality between closely spaced subcarriers, in some embodiments, the subcarriers of a particular individual multicarrier channel may have a null at substantially a center frequency of the other subcarriers of that individual multicarrier channel.

In some embodiments, multicarrier receiver 100 may receive one or more individual multicarrier channels and one or more spatial channels associated with each individual multicarrier channel. Spatial channels may be non-orthogonal channels (i.e., not separated in frequency) associated with a particular individual multicarrier channel in which orthogonality may be achieved through beamforming and/or diversity.

An OFDM or multicarrier symbol may be viewed as the combination of the symbols modulated on the individual subcarriers. Individual multicarrier channels may have bandwidths of approximately 20 MHz, and each of the individual multicarrier channels may have up to 64 or more orthogonal data subcarriers. The subcarriers may have a close spacing therebetween of approximately 312.5 kHz, although the scope of the invention is not limited in this respect. The subcarriers may be modulated with between zero and six bits per symbol or more.

In some embodiments, the frequency spectrums for a multicarrier communication channel may comprise individual multicarrier channels in either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable.

In some embodiments, multicarrier receiver 100 may be part of a wireless communication device and may be a personal digital assistant (PDA), a laptop or portable computer with wireless communication capability, a web tablet, a wireless telephone, a wireless headset, a pager, an instant messaging device, a digital camera, an access point or other device that may receive and/or transmit information wirelessly. In some embodiments, multicarrier receiver 100 may receive RF communications in accordance with specific communication standards, such as the Institute of Electrical and Electronics Engineers (IEEE) standards including IEEE 802.11(a), 802.11(b), 802.11(g/h) and/or 802.11 (n) standards for wireless local area networks (WLANs) and/or 802.16 standards for wireless metropolitan area networks (WMANs), although multicarrier receiver 100 may also be suitable to transmit and/or receive communications in accordance with other techniques including the Digital Video Broadcasting Terrestrial (DVB-T) broadcasting standard, and the High performance radio Local Area Network (HiperLAN) standard.

Antennas 102 may comprise directional or omnidirectional antennas, including, for example, dipole antennas, monopole antennas, loop antenna, microstrip antennas or other types of antennas suitable for reception of RF signals which may be processed by multicarrier receiver 100.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

All publications, patents, and patent documents are incorporated by reference herein, as though individually incorporated by reference. The invention has been described with reference to various specific and preferred embodiments and techniques. However, it should be understood that many variations and modifications may be made while remaining within the spirit and scope of the invention.

What is claimed is:

1. A method performed by a multicarrier receiver to receive an OFDM communication signal comprising a plurality of subcarriers through a plurality of antennas, the method comprising:
   generating, in a preliminary spatial correlator, a preliminary spatial correlation matrix for each active subcarrier by performing a symbol-by-symbol correlation on frequency-domain samples for each of the active subcarriers and averaging correlation outputs over a plurality of symbols;
   generating, in a channel length estimator, a channel length estimate from a channel estimate and a signal-to-noise ratio (SNR) estimate;
   generating, in a weighting values calculator, a channel length matrix from the channel length estimate by placing zeroes in non-diagonal positions, by placing ones in some diagonal positions based on the channel length estimate, and by placing zeros in other of the diagonal positions;
   generating, in a weighting values calculator, a weighting matrix from the channel length matrix, a modified fast Fourier transformation (FFT) matrix, and a pseudo-inverse of the modified FFT matrix; and
   generating, in a multiplier, final spatial correlation estimates for each active subcarrier by multiplying corresponding elements of the preliminary spatial correlation matrix by the weighting matrix.

2. The method of claim 1 wherein the multicarrier receiver receives the OFDM communication signal over a fading, frequency-selective communication channel with the plurality of antennas,
   wherein multiplying comprises multiplying preliminary spatial correlation estimates of the preliminary spatial correlation matrix by weighting values of the weighting matrix to generate the final spatial correlation estimates, and
   wherein the final spatial correlation estimates are used to separate different spatial channel components of the OFDM communication signal.

3. The method of claim 1 wherein the multicarrier receiver receives the OFDM communication signal over a fading, frequency-selective communication channel with the plurality of antennas,
   wherein multiplying comprises multiplying preliminary spatial correlation estimates of the preliminary spatial correlation matrix by weighting values of the weighting matrix to generate the final spatial correlation estimates, and
   wherein the final spatial correlation estimates are used, at least in part, to cancel co-channel interference of the OFDM communication signal.

4. The method of claim 1 further comprising:
   generating the channel length estimate from an impulse response of the channel estimate using a threshold value; and
   adjusting the threshold value based on the SNR estimate.

5. The method of claim 4 wherein generating the impulse response comprises performing an inverse fast-Fourier transform (IFFT) on the channel estimate to generate the impulse response of the channel estimate in the time-domain, and
   wherein adjusting the threshold value comprises either:
   decreasing the threshold value when the SNR estimate exceeds an upper value; or
   increasing the threshold value when the SNR estimate falls below a lower value.

6. The method of claim 1
   wherein multiplying comprises multiplying sets of corresponding elements of the preliminary spatial correlation matrices of all active subcarriers by the weighting matrix to generate final spatial correlation matrices for each active subcarrier.

7. The method of claim 1 wherein the modified FFT matrix is generated by removing rows corresponding to inactive subcarriers from an initial FFT matrix, and
   wherein the initial FFT matrix comprises a fast Fourier transformation of a time-domain signal sample sequence to a frequency-domain signal spectrum sample sequence.

8. The method of claim 7 wherein the modified FFT matrix has dimensions of $N_{sc} \times N_{FFT}$,
   wherein the channel length matrix is a diagonal matrix having dimensions of $N_{FFT} \times N_{FFT}$,
   wherein the pseudo-inverse of the modified FFT matrix has dimensions of $N_{FFT} \times N_{sc}$,
   wherein $N_{sc}$ is a number of the active subcarriers,
   wherein $N_{FFT}$ is a size of an FFT performed by the multicarrier receiver to generate frequency-domain samples, and wherein the frequency-domain samples from the OFDM communication signal are used to generate preliminary spatial correlation estimates of the preliminary spatial correlation matrix.

9. The method of claim 6 further comprising removing row vectors corresponding to inactive subcarriers from an initial FFT matrix to generate the modified FFT matrix.

10. The method of claim 1 wherein multiplying preliminary spatial correlation estimates of the preliminary spatial correlation matrix by weighting values of the weighting matrix generates the final spatial correlation estimates, and wherein the final spatial correlation estimates represent an estimate of auto-correlation and cross-correlation between the antennas for each of a plurality of subcarriers comprising the OFDM communication signal.

11. The method of claim 1 further comprising performing fast Fourier transforms on the OFDM communication signal received through each antenna to generate the frequency-domain samples for each subcarrier and for each antenna.

12. The method of claim 1 wherein multiplying the preliminary spatial correlation estimates by weighting values of the weighting matrix generates the final spatial correlation estimates, and wherein the method further comprises:

generating equalizer coefficients from the final spatial correlation estimates;

multiplying the frequency-domain samples from each antenna by the equalizer coefficients to generate equalized frequency-domain samples for each of a plurality of transmitted spatial data streams; and demapping the equalized frequency-domain samples to generate a serial symbol stream output.

13. A multicarrier receiver to receive an OFDM communication signal comprising a plurality of subcarriers through a plurality of antennas, the receiver comprising:

a preliminary spatial correlation estimator to generate a preliminary spatial correlation matrix for each active subcarrier by performing a symbol-by-symbol correlation on frequency-domain samples for each of the active subcarriers and averaging correlation outputs over a plurality of symbols;

a refinement unit comprising:

a channel length estimator to generate a channel length estimate from a channel estimate and a signal-to-noise ratio (SNR) estimate, and to generate a channel length matrix from the channel length estimate by placing zeroes in non-diagonal positions, by placing ones in some diagonal positions based on the channel length estimate, and by placing zeros in other of the diagonal positions;

a weighting values calculator to generate a weighting matrix from the channel length matrix, a modified fast Fourier transformation (FFT) matrix, and a pseudo-inverse of the modified FFT matrix; and a multiplier to generate final spatial correlation estimates for each active subcarrier by multiplying corresponding elements of the preliminary spatial correlation matrix by the weighting matrix.

14. The multicarrier receiver of claim 13 wherein the multicarrier receiver is to receive the OFDM communication signal over a fading, frequency-selective communication channel with the plurality of antennas, wherein the multiplier is to multiply preliminary spatial correlation estimates of the preliminary spatial correlation matrix by weighting values of the weighting matrix to generate the final spatial correlation estimates, and wherein the final spatial correlation estimates are used to separate different spatial channel components of the OFDM communication signal.

15. The multicarrier receiver of claim 13 wherein the multicarrier receiver is to receive the OFDM communication signal over a fading, frequency-selective communication channel with the plurality of antennas, wherein the multiplier is to multiply preliminary spatial correlation estimates of the preliminary spatial correlation matrix by weighting values of the weighting matrix to generate final spatial correlation estimates, and wherein the final spatial correlation estimates are used, at least in part, to cancel co-channel interference of the OFDM communication signal.

16. The multicarrier receiver of claim 13 wherein the channel length estimator generates the channel length estimate from an impulse response of the channel estimate using a threshold value, and adjusts the threshold value based on the SNR estimate.

17. The multicarrier receiver of claim 16 wherein the channel length estimator generates the impulse response by performing an inverse fast-Fourier transform (IFFT) on the channel estimate to generate the impulse response of the channel estimate in the time-domain, and wherein the channel length estimator is to either:

decrease the threshold value when the SNR estimate exceeds an upper value; or increase the threshold value when the SNR estimate falls below a lower value.

18. The multicarrier receiver of claim 13 wherein wherein the multiplier is to multiply sets of corresponding elements of the preliminary spatial correlation matrices of active subcarriers by the weighting matrix to generate final spatial correlation matrices for each active subcarrier.

19. The multicarrier receiver of claim 13 wherein the modified FFT matrix is generated by the weighting values calculator by removing rows corresponding to inactive subcarriers from an initial FFT matrix, and wherein the initial FFT matrix comprises a fast Fourier transformation of a time-domain signal sample sequence to a frequency-domain signal spectrum sample sequence.

20. The multicarrier receiver of claim 19 wherein the modified FFT matrix has dimensions of $N_{sc} \times N_{FFT}$, wherein the channel length matrix is a diagonal matrix having dimensions of $N_{FFT} \times N_{FFT}$, wherein the pseudo-inverse of the modified FFT matrix has dimensions of $N_{FFT} \times N_{sc}$, wherein $N_{sc}$ is a number of the active subcarriers, wherein $N_{FFT}$ is a size of an FFT performed by the multicarrier receiver to generate frequency-domain samples from the OFDM communication signal, and wherein the frequency-domain samples are used to generate preliminary spatial correlation estimates of the preliminary spatial correlation matrix.

21. The multicarrier receiver of claim 18 wherein the weighting values calculator is to remove row vectors corresponding to inactive subcarriers from an initial FFT matrix to generate the modified FFT matrix.

22. The multicarrier receiver of claim 13 wherein the multiplier is to multiply preliminary spatial correlation estimates of the preliminary spatial correlation matrix by weighting values of the weighting matrix to generate the final spatial correlation estimates, and wherein the final spatial correlation estimates represent an estimate of auto-correlation and cross-correlation between the antennas for each of a plurality of subcarriers comprising the OFDM communication signal.

23. The multicarrier receiver of claim 13 wherein the preliminary spatial correlation estimator comprises:
- a correlator to generate preliminary spatial correlation estimates of the preliminary spatial correlation matrix by performing the symbol-by-symbol correlation on frequency-domain samples from the OFDM communication signal; and
- an averager to average correlation outputs over the plurality of symbols.

24. The multicarrier receiver of claim 23 further comprising fast Fourier transformation (FFT) circuitry to perform FFTs on the OFDM communication signal received through each antenna to generate the frequency-domain samples for each subcarrier and for each antenna.

25. The multicarrier receiver of claim 23 wherein the multiplier is to multiply the preliminary spatial correlation estimates by weighting values of the weighting matrix to generate final spatial correlation estimates, and wherein the multicarrier receiver further comprises:
- equalizer coefficient generating circuitry to generate equalizer coefficients from the final spatial correlation estimates;
- equalizer circuitry to multiply the frequency-domain samples from each antenna by the equalizer coefficients to generate equalized frequency-domain samples for each a plurality of transmitted spatial data streams; and
- demapping circuitry to demap the equalized frequency-domain samples to generate a serial symbol stream output.

* * * * *

UNITED STATES PATENT AND TRADEMARK OFFICE
CERTIFICATE OF CORRECTION

PATENT NO. : 7,519,125 B2
APPLICATION NO. : 11/350621
DATED : April 14, 2009
INVENTOR(S) : Maltsev et al.

It is certified that error appears in the above-identified patent and that said Letters Patent is hereby corrected as shown below:

On the Title page, in field (75), in "Inventors", in column 1, line 1, delete "Maltsey" and insert -- Maltsev --, therefor.

On the Title page, in field (75), in "Inventors", in column 1, line 4, delete "Novgarod" and insert -- Novgorod --, therefor.

In column 12, line 31, in Claim 18, before "the" delete "wherein".

In column 14, line 12, in Claim 25, before "a" insert -- of --.

Signed and Sealed this

Thirtieth Day of June, 2009

JOHN DOLL
*Acting Director of the United States Patent and Trademark Office*